US008892431B2

(12) United States Patent
Gerkmann et al.

(10) Patent No.: US 8,892,431 B2
(45) Date of Patent: Nov. 18, 2014

(54) SMOOTHING METHOD FOR SUPPRESSING FLUCTUATING ARTIFACTS DURING NOISE REDUCTION

(75) Inventors: Timo Gerkmann, Bochum (DE); Colin Breithaupt, München (DE); Rainer Martin, Bochum (DE)

(73) Assignees: Ruhr-Universitaet Bochum, Bochum (DE), part interest; Siemens AudiologischeTechnik GmbH, Erlangen (DE), part interest ( * ) Notice: Subject to any disclaimer, the term of this patent is extended or adjusted under 35 U.S.C. 154(b) by 971 days.

(21) Appl. No.: 12/665,526

(22) PCT Filed: Jun. 25, 2008

(86) PCT No.: PCT/DE2008/001047

§ 371 (c)(1), (2), (4) Date: Dec. 18, 2009

(87) PCT Pub. No.: WO2009/000255

PCT Pub. Date: Dec. 31, 2008

(65) Prior Publication Data

US 2010/0182510 A1 Jul. 22, 2010

(30) Foreign Application Priority Data

Jun. 27, 2007 (DE) ......................... 10 2007 030 209

(51) Int. Cl.
*G10L 21/00* (2013.01)
*G10L 25/27* (2013.01)

(52) U.S. Cl.
CPC ............. *G01L 21/0208* (2013.01); *G10L 25/27* (2013.01); *G01L 25/24* (2013.01)
USPC ......................................................... 704/226

(58) Field of Classification Search
USPC ......................................................... 704/226
See application file for complete search history.

(56) References Cited

U.S. PATENT DOCUMENTS 5,365,592 A 11/1994 Horner et al.
5,737,485 A * 4/1998 Flanagan et al. .............. 704/232

(Continued)

FOREIGN PATENT DOCUMENTS

WO 0173761 A1 10/2001

OTHER PUBLICATIONS

Zenton Goh et al.: "Postprocessing Method for Suppressing Musical Noise Generated by Spectral Subtraction" IEEE Transactions on Spech and Audio Processing, vol. 6, No. 3, May 1998, pp. 287-292.
Petre Stoica et al.: "Smoothed Nonparametric Spectral Estimation Via Cepsturn Thresholding" IEEE Signal Processing Magazine [35] Nov. 2006, pp. 34-45.

(Continued)

*Primary Examiner* — Michael N Opsasnick
(74) *Attorney, Agent, or Firm* — Laurence A. Greenberg; Werner H. Stemer; Ralph E. Locher

(57) ABSTRACT

A smoothing method for suppressing fluctuating artifacts in the reduction of interference noise includes the following steps: providing short-term spectra for a sequence of signal frames, transforming each short-term spectrum by way of a forward transformation which describes the short-term spectrum using transformation coefficients that represent the short-term spectrum subdivided into its coarse and fine structures; smoothing the transformation coefficients with the respective same coefficient indices by combining at least two successive transformed short-term spectra; and transforming the smoothed transformation coefficients into smoothed short-term spectra by way of a backward transformation.

32 Claims, 9 Drawing Sheets

(56) References Cited

U.S. PATENT DOCUMENTS

| | | | | |
|---|---|---|---|---|
| 5,893,058 | A * | 4/1999 | Kosaka | 704/254 |
| 6,070,140 | A * | 5/2000 | Tran | 704/275 |
| 6,226,606 | B1 * | 5/2001 | Acero et al. | 704/218 |
| 6,766,292 | B1 | 7/2004 | Chandran et al. | |
| 7,124,075 | B2 * | 10/2006 | Terez | 704/203 |
| 7,272,556 | B1 * | 9/2007 | Aguilar et al. | 704/230 |
| 7,680,663 | B2 * | 3/2010 | Deng | 704/255 |
| 7,689,419 | B2 * | 3/2010 | Mahajan et al. | 704/256.2 |
| 8,145,488 | B2 * | 3/2012 | Yu et al. | 704/256.7 |
| 2002/0135618 | A1 * | 9/2002 | Maes et al. | 345/767 |
| 2002/0152069 | A1 * | 10/2002 | Gao et al. | 704/240 |
| 2003/0088401 | A1 * | 5/2003 | Terez | 704/207 |
| 2004/0002856 | A1 * | 1/2004 | Bhaskar et al. | 704/219 |
| 2005/0182624 | A1 * | 8/2005 | Wu et al. | 704/233 |

OTHER PUBLICATIONS

Tim Fingscheidt et al.: "Overcoming the Statistical Independence Assumption W.R.T. Frequency in Speech Enhancement" IEEE International Conference on Acoustics, Speech and Signal Processing (ICASSP), pp. 1081-1084, 2005.

Andrzej Czyzewski: "Multitask Noisy Speech Enhancement System" 2004, AES convention 116. paper#4-1.

Harald Gustafsson et al., "Spectral Subtraction Using Reduced Delay Convolution and Adaptive Averaging", IEEE Transactions on Speech and Audio Processing, IEEE Service Center, New York, NY, US, vol. 9, No. 8, Nov. 1, 2001, XP-011054141, ISSN: 1063-6676.

Breithaupt C et al: "Cepstral Smoothing of Spectral Filter Gains for Speech Enhancement Without Musical Noise" IEEE Signal Processing Letters, IEEE Service Center, Piscataway, NJ, US, vol. 14, No. 12, Dec. 1, 2007, pp. 1036-1039, XP011194896 ISSN: 1070-9908.

* cited by examiner

SMOOTHING METHOD FOR SUPPRESSING FLUCTUATING ARTIFACTS DURING NOISE REDUCTION

BACKGROUND OF THE INVENTION

Field of the Invention

The invention relates to a smoothing method for suppressing fluctuating artifacts during noise reduction.

In digital voice signal transmission, noise suppression is an important aspect. The audio signals captured by means of a microphone and then digitized contain not only the user signal (FIG. 1) but also ambient noise which is superimposed on the user signal (FIG. 2). In hands free installations in vehicles, for example, not only the voice signals but also engine and wind noise is captured, and in the case of hearing aids it is constantly changing ambient noise such as traffic noise or people speaking in the background, such as in a restaurant. This allows the voice signal to be understood only with increased effort. Accordingly, the noise reduction aims to make it easier to understand the voice. Therefore, a reduction in the noise must also not audibly distort the voice signal.

For noise reduction, the spectral representation is an advantageous representation of the signal. In this case, the signal is represented broken down into frequencies. One practical implementation of the spectral representation is short-term spectra, which are produced by dividing the signal into short frames (FIG. 3) which are subjected to spectral transformation separately from one another (FIG. 4). In this case, at a sampling rate of $f_s$=8000 Hz, a signal frame may comprise M=256 successive digital signal samples, for example, which then corresponds to a duration of 32 ms. A transformed frame then comprises M "frequency bins". The squared amplitude value of a frequency bin corresponds to the energy which the signal contains in the narrow frequency band of approximately 31 Hz bandwidth which is represented by the respective frequency bin. On account of the properties of symmetry of the spectral transformation, only M/2+1 of the M frequency bins, that is to say in the above example 129 bins, are relevant to the signal representation. With 129 relevant bins and 31 Hz bandwidth per bin, a spectral band from 0 Hz to approximately 4000 Hz is covered in total. This is sufficient to describe many voice sounds with sufficient spectral resolution. Another common bandwidth is 8000 Hz, which can be achieved using a higher sampling rate and hence more frequency bins for the same frame duration. In a short-term spectrum, the frequency bins are indexed by means of $\mu$. The index for frames is $\lambda$. The amplitudes of the short-term spectrum for a frame $\lambda$ are denoted generally as spectral magnitude $G_\mu(\lambda)$ in this case. A complete short-term spectrum comprising the M frequency bins of a frame is obtained from the amplitudes $G_\mu(\lambda)$ of the indices $\mu$=0 to $\mu$=M−1, that is to say $\mu$=0 . . . M−1. For real time signals, short-term spectra satisfy the symmetry condition $G_\mu(\lambda)=G_{M-\mu}(\lambda)$. A common form of presentation of the short-term spectra is what are known as spectrograms, which are formed by stringing together chronologically successive short-term spectra (cf. FIGS. 6 to 9, by way of example).

An advantage of the spectral representation is that the fundamental voice energy is present in a concentration in a relatively small number of frequency bins (FIGS. 4 and 6), whereas in the time signal all digital samples are of equal relevance (FIG. 3). The signal energy in the interference is in most cases distributed over a relatively large number of frequency bins. Since the frequency bins contain a different amount of voice energy, it is possible to suppress the noise in those bins which contain only little voice energy. The more narrowband the frequency bins, the more successful this separation.

For the noise reduction, a spectral weighting function is estimated which can be calculated on the basis of different optimization criteria. It provides low values or zero in frequency bins in which there is primarily interference, and values close or equal to one for bins in which voice energy is dominant (FIG. 5). The weighing function is generally reestimated for each signal frame in each frequency bin. The total amount of the weighting values for all frequency bins of a frame is also referred to as the "short-term spectrum of the weighting function" or simply as the "weighting function" in this case.

Multiplying the weighting function by the short-term spectrum of the noisy signal produces the filtered spectrum, in which the amplitudes of the frequency bins in which interference is dominant are greatly reduced, while voice components remain almost without influence (FIGS. 8 and 9).

Estimation errors when calculating the spectral weighting function, what are known as fluctuations, occasionally result in excessive weighting values for frequency bins which contain primarily interference (FIG. 8). This happens regardless of spectrally adjacent or chronologically preceding values. Fluctuations also even arise in spectral intermediate magnitudes, such as the estimate of the signal-to-noise ratio (SNR). Following multiplication of the weighting function containing estimation errors by the noisy short-term spectrum, the filtered spectrum contains single frequency bins which contain primarily interference and nevertheless have relatively high amplitudes. These bins are called outliers. When a time signal is synthesized from the filtered short-term spectra, the occasional outliers can be heard as tonal artifacts (musical noise), which are perceived as particularly irritating on account of their tonality (FIGS. 10 and 11). A single tonal artifact has the duration of a signal frame, and its frequency is determined by the frequency bin in which the outlier occurred.

To suppress fluctuations in the weighting function or in spectral intermediate magnitudes or suppress outliers in the filtered spectrum, these spectral magnitudes can be smoothed by an averaging method and hence rid of excess values. Spectral variables for a plurality of spectrally adjacent or chronologically successive frequency bins are in this case accounted for to form an average, so that the amplitude of individual outliers is put into relative terms. Smoothing is known over frequency [1: Tim Fingscheidt, Christophe Beaugeant and Suhadi Suhadi. Overcoming the statistical independence assumption w.r.t. frequency in speech enhancement. Proceedings, IEEE Int. Conf. Acoustics, Speech, Signal Processing (ICASSP), 1:1081-1084, 2005], in the course of time [2: Harald Gustafsson, Sven Erik Nordholm and Ingvar Claesson. Spectral subtraction using reduced delay convolution and adaptive averaging. IEEE Transactions on Speech and Audio Processing, 9(8): 799-807, November 2001] or as a combination of temporal and spectral averaging [3: Zenton Goh, Kah-Chye Tan and B. T. G. Tan. Postprocessing method for suppressing musical noise generated by spectral subtraction. IEEE Transactions on Speech and Audio Processing, 6(3):287-292, May 1998]. A drawback of smoothing over frequency is that accounting for a plurality of frequency bins involves the spectral resolution being reduced, that is to say that it becomes more difficult to distinguish between voice bins and noise bins. Temporal smoothing by combining successive values of a bin reduces the temporal dynamics of spectral values, that is to say their capability of following rapid changes in the voice over time. Distortion of the voice signal is the result (clipping). In addition, an irritating residual noise correlated to the voice signal can become audible (noise shaping). These smoothing methods in the spectral domain therefore need to be adapted to suit the voice signal, generally in complex fashion.

A further known form of smoothing individual short-term spectra over frequency is a method known as "liftering" [4: Andrzej Cryzewski. Multitask noisy speech enchangement system. http://sound.eti.pg.gda.pl/denoise/main.html, 2004], [5: Francois Thibault. High-level control of singing voice timbre transformations. http://www.music.mcgill.ca/thibault/Thesis/-node43.html, 2004]. In this case, the short-term spectrum of a frame λ is first of all transformed into what is known as the cepstral domain. The cepstral representation of the spectral amplitudes $G_u(\lambda)$ is calculated as $$G\frac{cepst}{\mu'}(\lambda) = IDFT\{\log(G_\mu(\lambda))\}, \quad (1)$$

$$\mu' = 0 \ldots (M-1), \mu = 0 \ldots (M-1)$$

where IDFT {•} corresponds to the inverse discrete Fourier Transformation (DFT) of a series of values of length M. This transformation results in M transformation coefficients $$G\frac{cepst}{\mu'}(\lambda),$$

what are known as the cepstral bins with index μ'. According to equation (1), the cepstrum basically comprises a nonlinear map, namely the logarithmization, of a spectral magnitude available as an absolute value and of a subsequent transformation of this logarithmized absolute value spectrum with a transformation. The advantage of cepstral representation of the amplitudes (FIG. 14) is that voice is no longer distributed over the frequency in the manner of a comb (FIGS. 4 and 6), but rather the fundamental information about the voice signal is represented in the cepstral bins with the small index. Furthermore, fundamental voice information is still represented in the relatively easily detected cepstral bin with a higher index, which represents what is known as the pitch frequency (voice fundamental frequency) of the speaker.

A smoothed short-term spectrum can be calculated by setting cepstral bins with relatively small absolute values to zero and then transforming back the altered cepstrum to a short-term spectrum again. However, since severe fluctuations or outliers result in correspondingly high amplitudes in the cepstrum, these artifacts cannot be detected and suppressed by these methods.

As an alternative to liftering, there is also the method according to [6: Petre Stoica and Niclas Sandgren. Smoothed nonparametric spectral estimation via cepstrum thresholding. IEEE Signal Processing Magazine, pages 34-45, November 2006]. In this case, cepstral bins selected on the basis of a criterion are not set to zero, but rather are set to a value which is optimum for estimating long-term spectra for steady signals from short-term spectra. This form of estimation of signal spectra does not generally provide any advantages for highly transient signals such as voice.

BRIEF SUMMARY OF THE INVENTION

Against this background, the invention is based on the object of demonstrating, for the noise reduction, a smoothing method for suppressing fluctuations in the weighting function or in spectral intermediate magnitudes or outliers in filtered short-term spectra which neither reduces the frequency resolution of the short-term spectra nor adversely affects the temporal dynamics of the voice signal.

This object is achieved by means of a smoothing method having the measures of patent claim 1. Advantageous developments are the subject matter of the subclaims.

The smoothing method according to the invention comprises the following steps:

- short-term spectra for a series of signal frames are provided,
- each short-term spectrum is transformed by forward transformation, which describes the short-term spectrum using transformation coefficients which represent the short-term spectrum divided into its coarse and its fine structures,
- the transformation coefficients with the same coefficient indices in each case are smoothed by combining at least two successive transformed short-term spectra, and
- the smoothed transformation coefficients are transformed into smoothed short-term spectra by backward transformation.

The smoothing method according to the invention uses a transformation such as the cepstrum in order to describe a broadband voice signal with as few transformation coefficients as possible in its fundamental structure. Unlike in known methods, the transformation coefficients are not set to zero independently of one another if they are below a threshold value, however. Instead, the values of transformation coefficients from at least two successive frames are accounted for together by smoothing over time. In this case, the degree of smoothing is made dependent on the extent to which the spectral structure represented by the coefficient is crucial to describing the user signal. By way of example, the degree of temporal smoothing of a coefficient is therefore dependent on whether a transformation coefficient contains a large amount of voice energy or little. This is easier to determine in the cepstrum or similar transformations than in the short-term spectrum. By way of example, it may thus be assumed that the first four cepstral coefficients with indices μ'=0 . . . 3 and additionally the coefficient with a maximum absolute value and index μ' greater than 16 and less than 160 at $f_s$=8000 Hz (pitch) represent voice. Coefficients with a large amount of voice information are smoothed only to the extent that their temporal dynamics do not become less than in the case of a noiseless voice signal. If appropriate, these coefficients are not smoothed at all. Voice distortions are prevented in this way. Since spectral fluctuations and outliers represent a short-term change in the fine structure of a short-term spectrum, they are mapped in the transformed short-term spectrum as a short-term change in those transformation coefficients which represent the fine structure of the short-term spectrum. Since these transformation coefficients have a relatively low rate of change over time in the case of noiseless voice, these very coefficients can be smoothed much more. Heavier temporal smoothing therefore counteracts the formation of outliers without influencing the structure of the voice. The smoothing method therefore does not result in decreased spectral resolution for voice sounds. The change in the fine structure of the short-term spectrum in the case of successive frames is delayed such that only narrowband spectral changes with time constants below those of noiseless voice are prevented.

From the smoothed magnitude, denoted as $$G\frac{cepst}{\mu' \text{smooth}}(\lambda),$$

it is possible to obtain a spectral representation of the smoothed short-term spectrum again by backward transformation. For a cepstral representation, as described in (1), one possible backward transformation is as follows:

$$G_{\mu,smooth}(\lambda) = \exp\left(DFT\left\{G\frac{cepst}{\mu' \text{smooth}}(\lambda)\right\}\right), \quad (2)$$
$$\mu = 0 \ldots (M-1), \mu' = 0 \ldots (M-1),$$

where DFT{ } corresponds to the discrete Fourier transformation and exp( ) corresponds to the exponential function which is applied element by element in (2).

The advantages which result from the inventive smoothing of short-term spectra are as follows:

effective suppression of fluctuations or outliers, retention of the spectral resolution for voice signals, and no audible influencing of voice.

It is important to note that the inverse DFT used for the cepstrum in (1) and the DFT for the backward transformation in (2) can be replaced by other transformations without thereby losing the basic properties of the transformation coefficients with regard to the compact representation of voice. The same situation applies to the logarithmization in (1) and the corresponding reversal function in (2), the exponential function. In these cases too, other nonlinear maps and also linear maps are conceivable.

Transformations differ in the base functions used thereof. The process of transformation means that the signal is correlated to the various base functions. The resulting degree of correlation between the signal and a base function is then the associated transformation coefficient. A transformation involves production of as many transformation coefficients as there are base functions. The number thereof is denoted by M in this case. Transformations which are important for the invention are those whose base functions break down the short-term spectrum to be transformed into its coarse structure and its fine structure.

A distinguishing feature of transformations is the orthogonality. Orthogonal transformation bases contain only base functions which are uncorrelated. If the signal is identical to one of the base functions, orthogonal transformations result in transformation coefficients with the value zero, apart from the coefficient which is identical to the signal. The selectivity of an orthogonal transformation is accordingly high. Nonorthogonal transformations use function bases which are correlated to one another.

A further feature is that the base functions for the incidence of application under consideration are discrete and finite, since the processed signal frames are discrete signals with the length of a frame.

An important feature of a transformation is the invertability. If there is an inverse transformation for a transformation (forward transformation), transforming a signal into transformation coefficients and subsequently subjecting these coefficients to inverse transformation (backward transformation) produces the initial signal again if the transformation coefficients have not been altered.

In the signal processing as described here, Discrete Fourier Transformation (DFT) is a preferred transformation. An associated important algorithm in discrete signal processing is "Fast Fourier Transformation" (FFT). In addition, Discrete Cosine Transformation (DCT) and Discrete Sine Transformation (DST) are frequently used transformations. In this case, these transformations are combined under the term "standard transformations". An already mentioned property of standard transformations which is crucial to the invention is that the amplitudes of the various transformation coefficients represent different degrees of fine structure for the transformed signal. Thus, coefficients with small indices describe the coarse structures of the transformed signal, because the associated base functions are audio-frequency harmonic functions. The higher the index of a transformation coefficient up to $\mu'=M/2$, the finer the structures of the transformed signal which are described by said coefficients. For coefficients beyond this, this property is turned around on account of the symmetry of the coefficients. Usually, signal processing involves only the coefficients with indices $\mu'=0$ to $\mu'=M/2$ being processed and the remaining values being ascertained by mirroring the results.

In addition, the invertability of the transformations makes it possible to interchange the transformation and the inverse thereof in the forward and backward transformation. In (1), it is thus also possible to use the DFT from (2), for example, if the IDFT from (1) is used in (2).

Advantageously, the spectral coefficients of the short-term spectra are mapped nonlinearly before the forward transformation. A basic property of nonlinear mapping which is advantageous for the invention is dynamic compression of relatively large amplitudes and dynamic expansion of relatively small amplitudes.

Accordingly, the spectral coefficients of the smoothed short-term spectra can be mapped nonlinearly after the backward transformation, the nonlinear mapping after the backward transformation being the reversal of the nonlinear mapping before the forward transformation.

Expediently, the spectral coefficients are mapped nonlinearly before the forward transformation by logarithmization.

A form of temporal smoothing can be achieved by a preferably first-order recursive system:

$$G\frac{cepst}{\mu', \text{smooth}}(\lambda) = \beta_{\mu'} G\frac{cepst}{\mu', \text{smooth}}(\lambda - 1) + (1 - \beta_{\mu'})c(\lambda). \quad (3)$$

Possible values for the smoothing constants for coefficients of the standard transformations in the case of voice signals are $\beta_{\mu'}=0$ for $\mu'=0 \ldots 3$, $\beta_{\mu'}=0.8$ for $\mu'=4 \ldots M/2$ with the exception of the transformation coefficients which represent the pitch frequency of a speaker, and $\beta_{\mu'}=0.4$ for transformation coefficients which represent the pitch frequency. Methods for determining the pitch coefficient are widely available in the literature. By way of example, to determine the coefficient for the pitch, it is possible to select that coefficient whose index is between $\mu'=16$ and $\mu'=160$ and which has the maximum amplitude of all the coefficients in this index range. For the remaining transformation coefficients with indices $\mu'=M/2+1 \ldots M-1$, the symmetry condition $\beta_{M-\mu'}=\beta_{\mu'}$ applies. The values are suitable for the standard transformations and also short-term spectra which have arisen from signals where $f_s=8000$ Hz. They can be adapted to suit other systems by proportional conversion. The selection $\beta_{\mu'}=0$ means that the relevant coefficients are not being smoothed. A crucial property of the invention is that coefficients which describe the coarse profile of the short-term spectrum are smoothed as little as possible if voice signals are being denoised. Thus, the coarse structures of the broadband voice spectrum are protected from smoothing effects. The fine structures of fluctuations or spectral outliers are mapped in the transformation coefficients between $\mu'=4$ and $\mu'=M/2$ in the case of standard transformations, which is why said transformation coefficients are smoothed much apart from the pitch of the voice.

Advantageously, the smoothing method is applied to the absolute value or a power of the absolute value of the short-term spectra.

It is particularly advantageous if different time constants are used to smooth the respective transformation coefficients. The time constants can be chosen such that the transformation coefficients which represent primarily voice are smoothed little. Expediently, the transformation coefficients which describe primarily fluctuating background noise and artifacts of the noise reduction algorithms can be smoothed much.

The short-term spectrum provided may be the spectral weighting function of a noise reduction algorithm. Advantageously, the short-term spectrum used may also be the spectral weighting function of a post filter for multichannel methods for noise reduction. Expediently, the spectral weighting function is in this case obtained from the minimization of an error criterion.

The short-term spectrum provided may also be a filtered short-term spectrum.

According to another development of the method, the short-term spectrum provided is a spectral weighting function of a multichannel method for noise reduction.

The short-term spectrum provided may also be an estimated coherence or an estimated "Magnitude Squared Coherence" between at least two microphone channels.

Advantageously, the short-term spectrum provided is a spectral weighting function of a multichannel method for speaker or source separation.

In addition, provision is made for the short-term spectrum provided to be a spectral weighting function of a multichannel method for speaker separation on the basis of phase differences for signals in the various channels (Phase Transform—PHAT).

In addition, it is possible for the short-term spectrum used to be a spectral weighting function of a multichannel method on the basis of a "Generalized Cross-Correlation" (GCC). The short-term spectrum provided may also be spectral magnitudes which contain both voice and noise components.

The short-term spectrum provided may also be an estimate of the signal-to-noise ratio in the individual frequency bins. In addition, the short-term spectrum used may be an estimate of the noise power.

The problem of fluctuations in short-term spectra is known not only in audio signal processing. Further advantageous areas of application are image and medical signal processing.

In image processing, the rows of an image can be interpreted as a signal frame, for example, which can be transformed into the spectral domain. In this case, the frequency bins produced are called local frequency bins. When images are processed in the local frequency domain, algorithms are used which are equivalent to those in audio signal processing. Possible fluctuations which these algorithms produce in the local frequency domain result in visual artifacts in the processed image. These are equivalent to tonal noise in audio processing.

In medical signal processing, signals are derived from the human body which may exhibit noise in the manner of audio signals. The noisy signal can be transformed into the spectral domain frame by frame as appropriate. The resultant spectrograms can be processed in the manner of audio spectra.

The smoothing method can be used in a telecommunication network and/or for a broadcast transmission in order to improve the voice and/or image quality and in order to suppress artifacts. In mobile voice communication, distortions in the voice signal arise which are caused firstly by the voice coding methods used (redundancy-reducing voice compression) and the associated quantization noise and secondly by the interference brought about by the transmission channel. Said interference in turn has a high level of temporal and spectral fluctuation and results in a clearly perceptible worsening of the voice quality. In this case, too, the signal processing used at the receiver end or in the network needs to ensure that the quasi-random artifacts are reduced. To improve quality, what are known as post filters and error masking methods have been used to date. Whereas the post filter predominantly has the task of reducing quantization noise, error masking methods are used to suppress transmission-related channel interference. In both applications, improvements can be attained if the smoothing method according to the invention is integrated into the post filter or the masking method. The smoothing method can therefore be used as a post filter, in a post filter, in combination with a post filter, as part of an error masking method or in conjunction with a method for voice and/or image coding (decompression method or decoding method), particularly at the receiver end. When the method is used as a post filter, this means that the method is used for post filtering, that is to say an algorithm which implements the method is used to process the data which arise in the applications. It is also possible to improve the quality of the voice signal in the telecommunication network by smoothing the voice signal spectrum or a magnitude derived therefrom using the smoothing method according to the invention.

BRIEF DESCRIPTION OF THE SEVERAL VIEWS OF THE DRAWING

The invention is explained in more detail below with reference to illustrations which are shown in the figures, in which.

DESCRIPTION OF THE INVENTION

Figure 1:
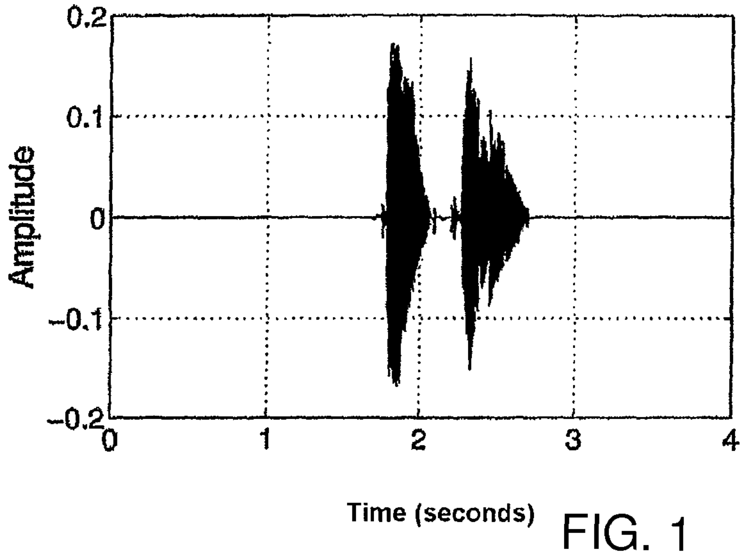
FIG. 1 shows a noiseless time signal.
Figure 2:
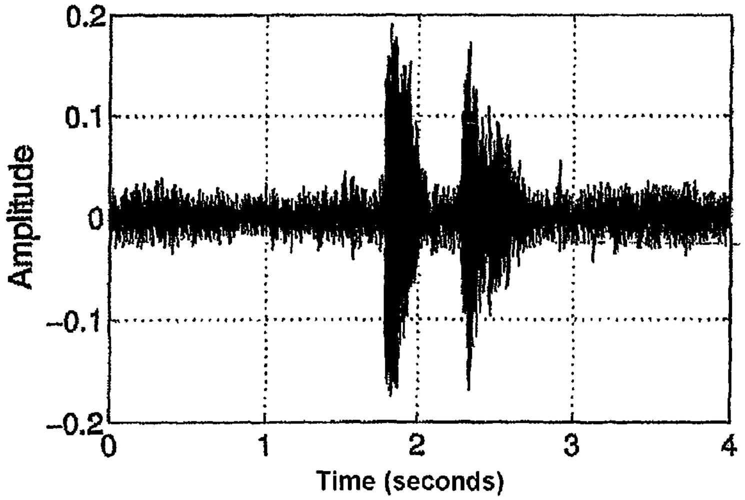
FIG. 2 shows a noisy time signal.

FIG. 1 shows a noiseless signal in the form of the amplitude over time. The duration of the signal is 4 seconds, and the amplitudes range from approximately −0.18 to approximately 0.18. FIG. 2 shows the signal in noisy form. It is possible to see a random background noise over the entire time profile.

Figure 3:
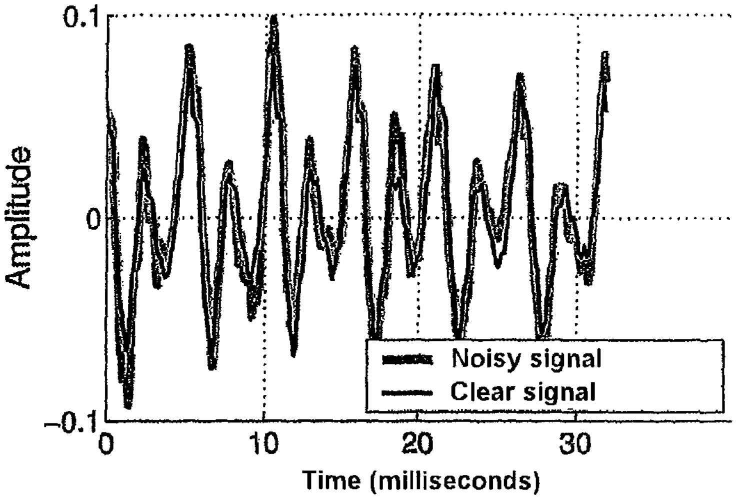
FIG. 3 shows a single signal frame in the time domain.

FIG. 3 shows the signal for an individual signal frame λ. The signal frame has a segment duration of 32 milliseconds. The amplitude of both graphs varies between −0.1 and 0.1. The individual samples of the digital signals are connected to form graphs. The noisy graph represents the input signal, which contains the noiseless signal. Separation of signal and noise in the noisy signal is almost impossible in this representation of the signal.

Figure 4:
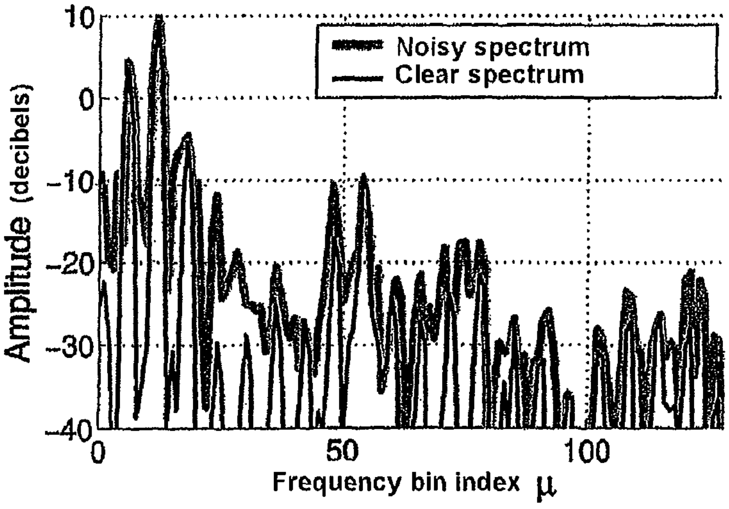
FIG. 4 shows a single signal frame in the spectral domain.

FIG. 4 shows a representation of the same signal frame following the transformation into the frequency domain. The individual frequency bins μ are connected to form graphs. In this figure too, the frequency bins are shown in noisy and noiseless form, the noiseless signal again being the voice signal which the noisy signal contains. The frequency bins μ from 0 to 128 are shown on the abscissa. They have amplitudes of approximately −40 decibels (dB) to approximately 10 dB. By comparing the graphs, it is possible to see that the energy in the voice signal is concentrated in individual frequency bins in a comb-like structure, whereas the noise is also present in the bins in between.

Figure 5:
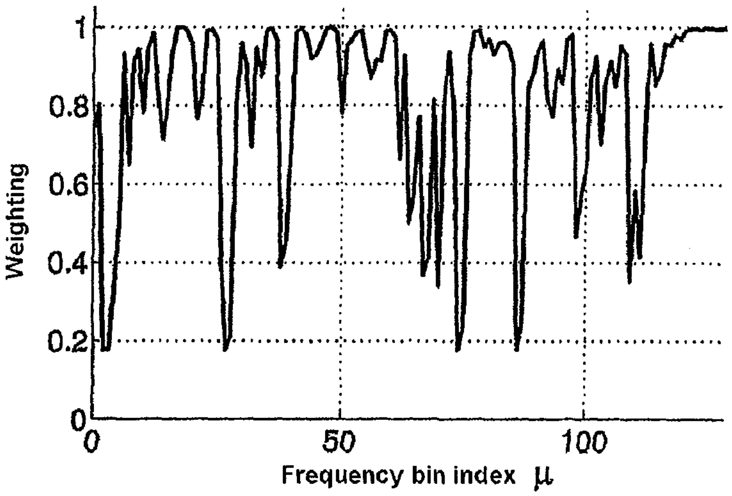
FIG. 5 shows a weighting function for a single frame.

FIG. 5 shows a weighting function for the noisy frame from FIG. 4. For each frequency bin μ, a factor of between 0 and 1 is obtained on the basis of the ratio of voice energy and noise energy. The individual weighting factors are connected to form a graph. It is again possible to see the comb-like structure of the voice spectrum.

Figure 6:
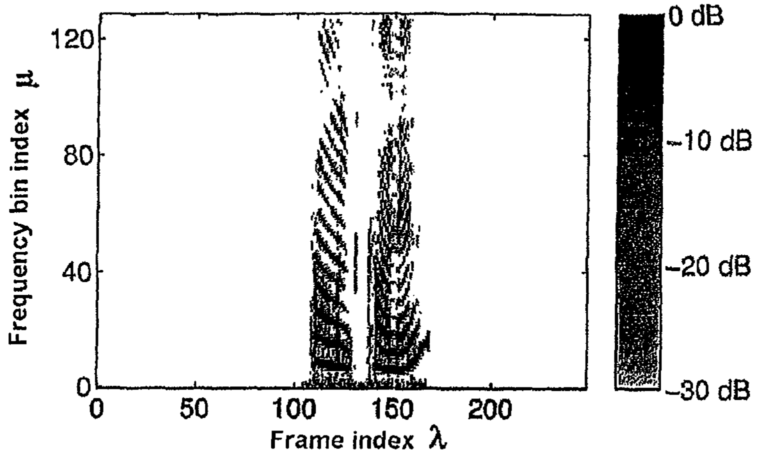
FIG. 6 shows the spectrogram of a noiseless signal.
Figure 7:
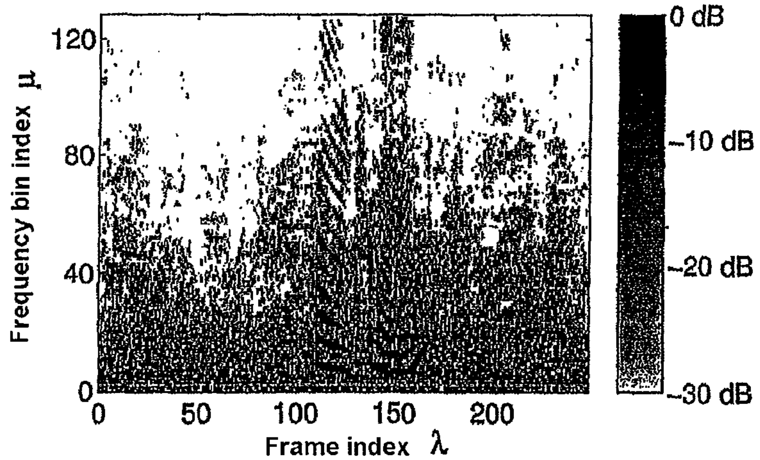
FIG. 7 shows the spectrogram of a noisy signal.

FIGS. 6 and 7 show spectrograms comprising a series of noiseless and noisy short-term spectra (FIG. 4). The frame index λ is plotted on the abscissa, and the frequency bin index μ is plotted on the ordinate. The amplitudes of the individual frequency bins are shown as grayscale values. In comparing FIGS. 6 and 7, it becomes clear how voice is concentrated in few frequency bins. In addition, it forms regular structures. By contrast, the noise is distributed over all frequency bins.

Figure 8:
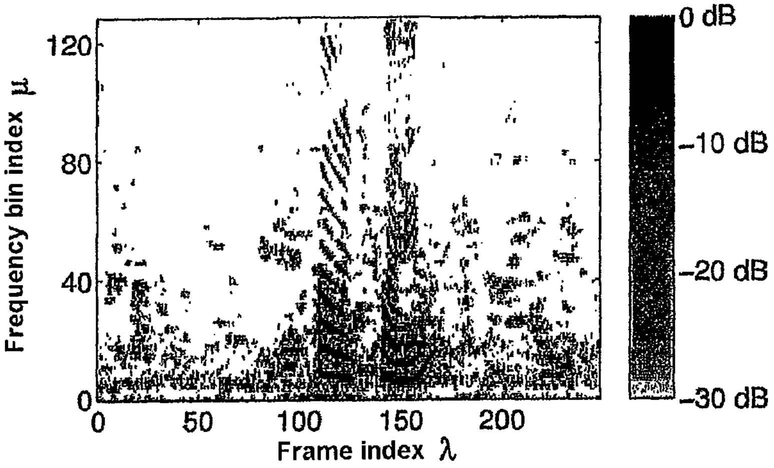
FIG. 8 shows the spectrogram of a signal filtered using the unsmoothed weighting function

FIG. 8 shows the spectrogram for a filtered signal. The axes correspond to those from FIGS. 6 and 7. From a comparison with FIG. 6, it is possible to see that estimation errors in the weighting function mean that high amplitudes remain in frequency bins which contain no voice. Suppressing these outliers is the aim of the method according to the invention.

Figure 9:
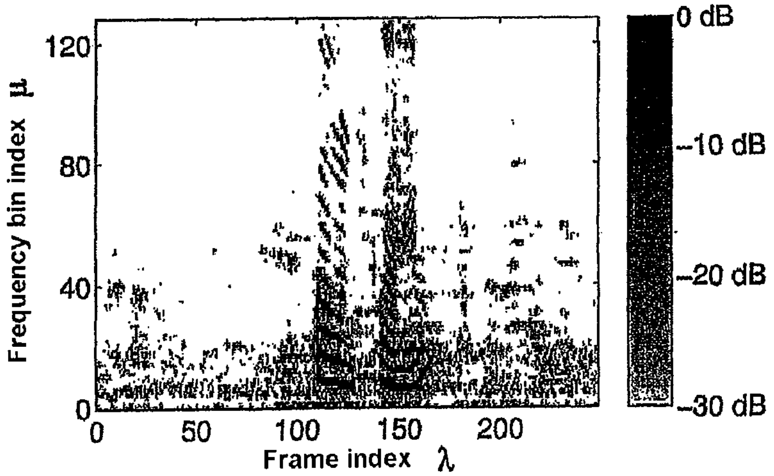
FIG. 9 shows the spectrogram of a signal filtered using a weighting function smoothed in accordance with the invention.

FIG. 9 shows the spectrogram for a signal which, in line with one preferred development of the method according to the invention, has been filtered using a smoothed weighting function. The axes correspond to those of the preceding spectrograms. In comparison with FIG. 8, the outliers are greatly reduced. The voice components in the spectrogram are by contrast obtained in their fundamental form.

Figure 10:
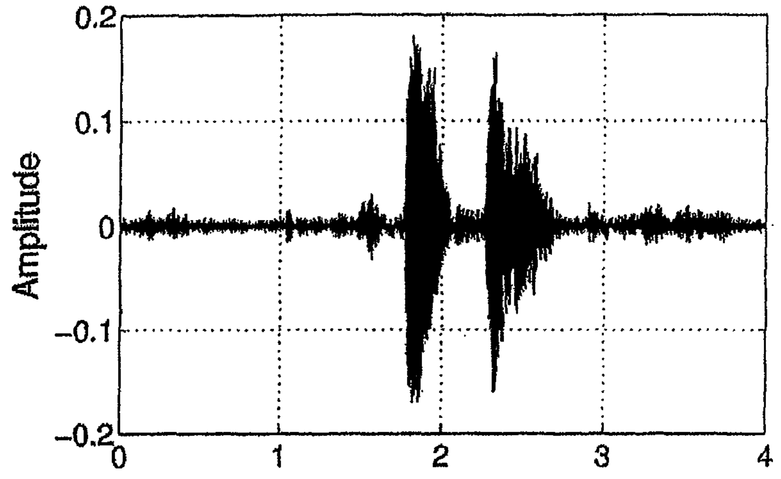
FIG. 10 shows a filtered time signal with tonal artifacts.
Figure 11:
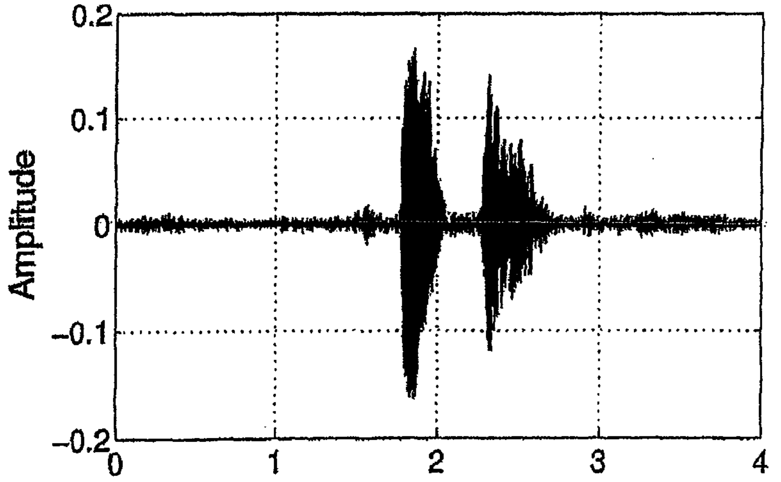
FIG. 11 shows a time signal filtered in accordance with the invention.

FIGS. 10 and 11 show time signals which are respectively obtained from the filtered spectra in FIGS. 8 and 9. The amplitude is plotted over time. The signals are 4 seconds long and have amplitudes between approximately −0.18 and 0.18. In the associated time signal in FIG. 10, the outliers in the spectrogram from FIG. 8 produce clearly visible tonal artifacts which are not present in the noiseless signal from FIG. 1. The time signal in FIG. 11 has a significantly quieter profile for the residual noise. This time signal is obtained from a spectrogram from FIG. 9, which was produced by filtering using the smoothed weighting function.

Figure 12:
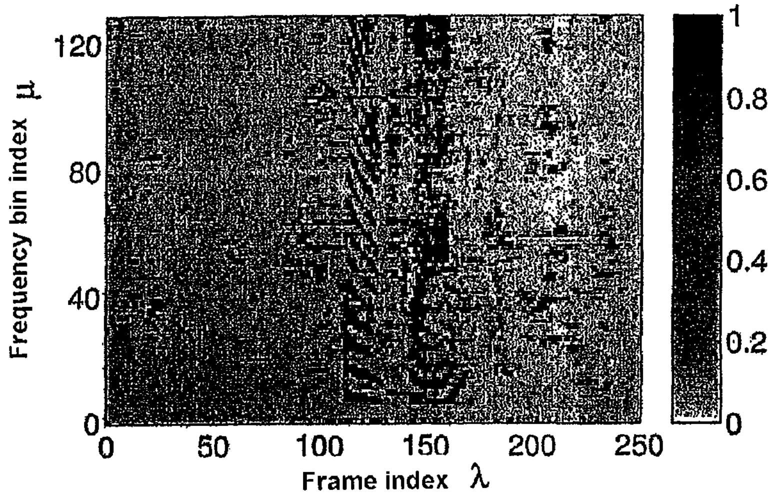
FIG. 12 shows the spectrogram of an unsmoothed weighting function.

FIG. 12 shows the unsmoothed weighting function for all frames. For each frame λ, frequency bins μ are plotted along the ordinate. The values of the weighting function are shown in gray. The fluctuations which result from estimation errors can be seen as irregular blotches.

Figure 13:
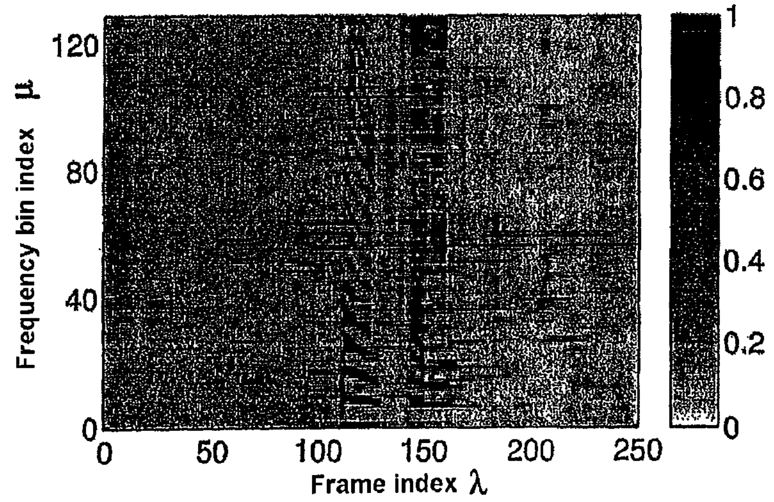
FIG. 13 shows the spectrogram of a weighting function smoothed in accordance with the invention.

FIG. 13 shows the smoothed weighting function for all frames. The axes correspond to those from FIG. 12. The smoothing spreads the fluctuations and greatly reduces their value. By contrast, the structure of the voice frequency bins continues to be clearly visible.

Figure 14:
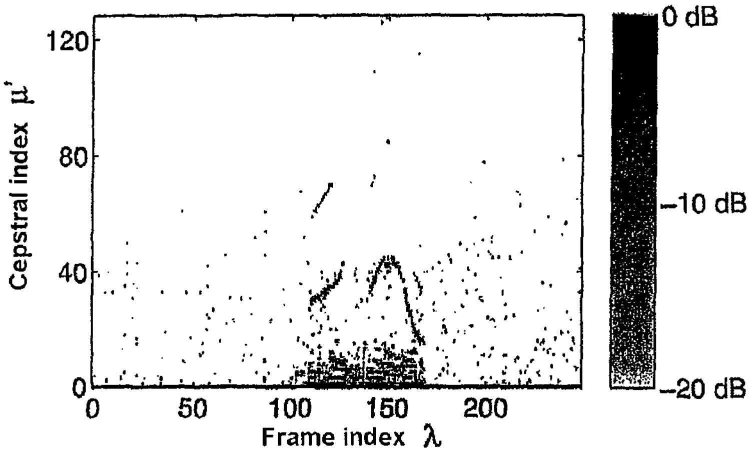
FIG. 14 shows the absolute value of the cepstrum of a noiseless voice signal.

FIG. 14 shows the absolute value of the cepstrum of a noiseless signal over all frames. For each frame λ, cepstral bins μ' are plotted along the ordinate. The values of the absolute values of the cepstral coefficients $$G\frac{cepst}{\mu'}(\lambda)$$

are shown in gray. A comparison with FIG. 6 shows that voice in the cepstrum is concentrated over an even smaller number of coefficients. Furthermore, the position of these coefficients is less variable. It is also possible to clearly see the profile of the cepstral coefficient which represents the pitch frequency.

Figure 15:
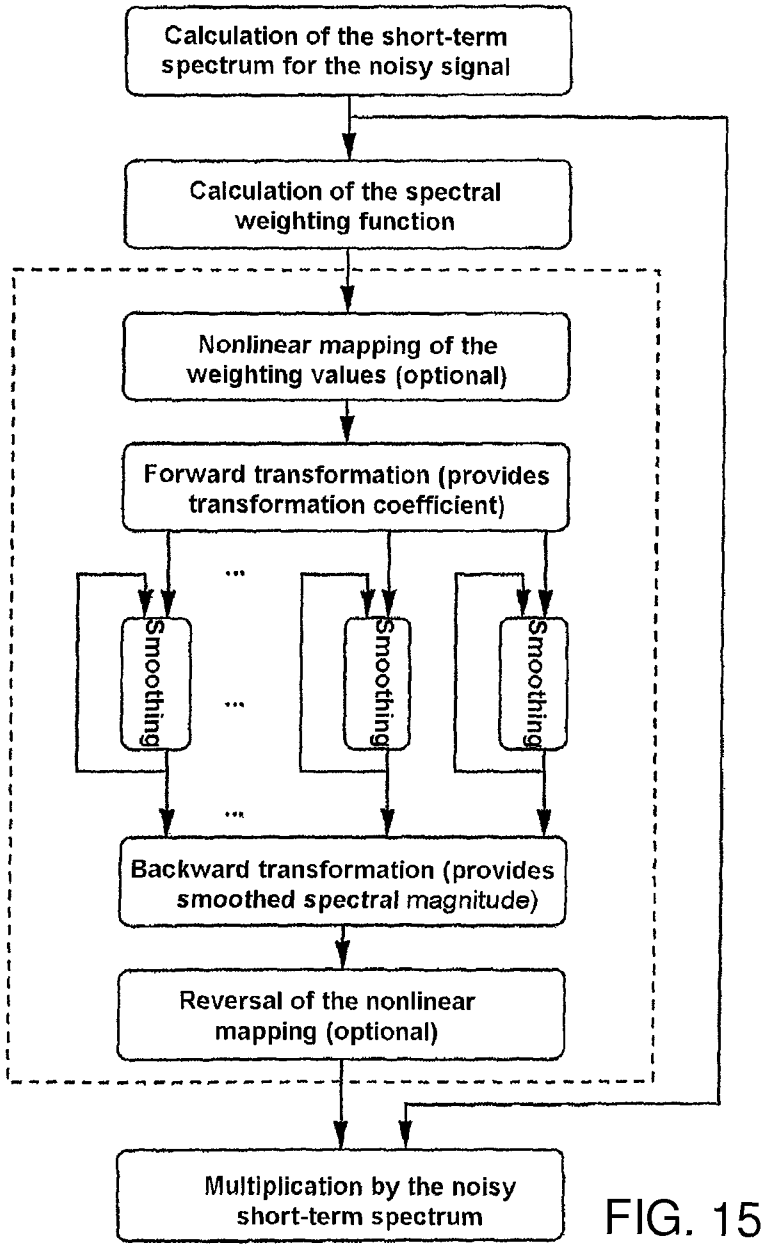
FIG. 15 shows the signal flowchart in accordance with a preferred embodiment of the invention.

FIG. 15 shows a signal flowchart in accordance with a preferred embodiment of the invention. A noisy input signal is transformed into a series of short-term spectra, these are then used to estimate a weighting function for filtering over spectral intermediate magnitudes. One frame at a time is handled in each case. First of all, the short-term spectra for the weighting function are subjected to nonlinear, logarithmic mapping. This is followed by forward transformation into the cepstral domain. The short-term spectra transformed in this manner are therefore represented by transformation coefficients for the base functions. The transformation coefficients calculated in this way are smoothed separately from one another using different time constants. The recursive nature of the smoothing is indicated by tracing the output of the smoothing to its input. Of the signal paths for a total of M transformation coefficients, only three are shown, the remainder having being replaced by three dots " . . . ". The smoothing is followed by backward transformation and then the nonlinear reversal mapping. In this way, the result obtained is a series of smoothed short-term spectra for the weighting function. These smoothed short-term spectra for the weighting function can be multiplied by the noisy short-term spectra, which produces filtered short-term spectra with a few outliers. These are then converted into a time signal with the reduced noise level. The portion of the signal flowchart which describes the smoothing according to the invention is surrounded by dashed border.

The invention claimed is:

1. A smoothing method for suppressing fluctuating artifacts during noise reduction, which comprises the following steps:

providing short-term spectra for a series of signal frames, wherein a first forward transformation, using a signal from the time domain as input, generates the short-term spectra;

transforming each short-term spectrum of the short-term spectra by a second forward transformation, the second forward transformation describing the short-term spectrum using transformation coefficients which describe the short-term spectrum divided into coarse structures and fine structures thereof;

smoothing the transformation coefficients with the same coefficient indices in each case by combining at least two successive transformed short-term spectra, wherein different time constants are used for smoothing the respective transformation coefficients, wherein the time constants are chosen such that transformation coefficients describing spectral structures of fluctuating spectral magnitudes and of artifacts of noise reduction algorithms are smoothed to a greater extent than transformation coefficients typically describing spectral structures of speech; and transforming the smoothed transformation coefficients into smoothed short-term spectra by backward transformation.

2. The smoothing method according to claim 1, which comprises using an inverse of the forward transformation for the backward transformation.

3. The smoothing method according to claim 1, which comprises using a transformation with an orthogonal base.

4. The smoothing method according to claim 1, which comprises using a transformation with a nonorthogonal base.

5. The smoothing method according to claim 1, which comprises using a discrete Fourier transform and an inverse thereof as the transformations.

6. The smoothing method according to claim 1, which comprises using fast Fourier transform and an inverse thereof as the transformations.

7. The smoothing method according to claim 1, which comprises using discrete cosine transformation and an inverse thereof for the transformations.

8. The smoothing method according to claim 1, which comprises using a discrete sine transformation and an inverse thereof for the transformations.

9. The smoothing method according to claim 1, which comprises mapping the short-term spectra nonlinearly before the forward transformation.

10. The smoothing method according to claim 9, which comprises mapping the smoothed short-term spectra nonlinearly after the backward transformation, wherein the nonlinear mapping of the backward transformation is a reversal of the nonlinear mapping of the forward transformation.

11. The smoothing method according to claim 9, which comprises mapping the short-term spectra nonlinearly before the forward transformation by logarithmization.

12. The smoothing method according to claim 1, which comprises using recursive smoothing for smoothing the transformation coefficients.

13. The smoothing method according to claim 1, which comprises using nonrecursive smoothing for smoothing the transformation coefficients.

14. The smoothing method according to claim 1, which comprises applying smoothing to an absolute value or to a power of the absolute value of the short-term spectra.

15. The smoothing method according to claim 1, wherein the short-term spectrum is a spectral weighting function of a noise reduction algorithm.

16. The smoothing method according to claim 1, wherein the short-term spectrum is a spectral weighting function of a post filter for multichannel methods for noise reduction.

17. The smoothing method according to claim 15, wherein the spectral weighting function results from a minimization of an error criterion.

18. The smoothing method according to claim 1, wherein the short-term spectrum is a filtered short-term spectrum.

19. The smoothing method according to claim 1, wherein the short-term spectrum is a spectral weighting function of a multichannel method for noise reduction.

20. The smoothing method according to claim 1, wherein the short-term spectrum is an estimated coherence or an estimated "magnitude squared coherence" between at least two microphone channels.

21. The smoothing method according to claim 1, wherein the short-term spectrum is a spectral weighting function of a multichannel method for speaker or source separation.

22. The smoothing method according to claim 1, wherein the short-term spectrum is a spectral weighting function of a multichannel method for speaker separation on a basis of phase differences for signals in different channels.

23. The smoothing method according to claim 1, wherein the short-term spectrum is a spectral weighting function of a multichannel method for noise reduction on a basis of a "generalized cross-correlation."

24. The smoothing method according to claim 1, wherein the short-term spectrum contains spectral magnitudes containing both voice and noise components.

25. The smoothing method according to claim 1, wherein the short-term spectrum is an estimate of a signal-to-noise ratio.

26. The smoothing method according to claim 1, wherein the short-term spectrum is an estimate of a noise power.

27. The smoothing method according to claim 1, wherein the short-term spectrum comprises transformed signal frames of an image signal, and the coefficients of the transformed image signal calculated row by row or column by column or two-dimensionally are subjected to spatial smoothing with different smoothing parameters.

28. The smoothing method according to claim 27, wherein the image signal is a video signal.

29. The smoothing method according to claim 1, which comprises using, as the short-term spectrum, a transformed medical signal derived from the human body.

30. The smoothing method according to claim 1, which comprises using the smoothing method in a post filter, in combination with a post filter, as part of an error masking method, or in connection with a method for voice and/or image coding.

31. The smoothing method according to claim 1, which comprises using the smoothing method at a receiver end.

32. The smoothing method according to claim 1, which comprises using the smoothing method in a telecommunication network and/or during a broadcast transmission for improving a voice and/or image quality and for suppressing artifacts.

* * * * *